US008815045B2

(12) United States Patent
Honda (10) Patent No.: US 8,815,045 B2
(45) Date of Patent: Aug. 26, 2014

(54) METHOD FOR MANUFACTURING SEMI-FINISHED BLANK FOR VARIFOCAL LENS (75) Inventor: Kenichi Honda, Ehime (JP)

(73) Assignee: Panasonic Healthcare Co., Ltd., Ehime (JP)

( * ) Notice: Subject to any disclaimer, the term of this patent is extended or adjusted under 35 U.S.C. 154(b) by 0 days.

(21) Appl. No.: 13/514,436

(22) PCT Filed: Oct. 19, 2011

(86) PCT No.: PCT/JP2011/005834
§ 371 (c)(1),
(2), (4) Date: Jun. 7, 2012

(87) PCT Pub. No.: WO2012/081157
PCT Pub. Date: Jun. 21, 2012

(65) Prior Publication Data
US 2012/0267045 A1    Oct. 25, 2012

(30) Foreign Application Priority Data

Dec. 15, 2010   (JP) ................. 2010-279340

(51) Int. Cl.
| B29C 65/00 | (2006.01) |
| B32B 37/00 | (2006.01) |
| B32B 17/00 | (2006.01) |
| C03C 27/00 | (2006.01) |
| G02F 1/1339 | (2006.01) |
| G02F 1/1341 | (2006.01) |
| G02F 1/29 | (2006.01) |
| G02F 1/1333 | (2006.01) |

(52) U.S. Cl.
CPC ........ *G02F 1/1341* (2013.01); *G02F 2001/294* (2013.01); *G02F 1/1339* (2013.01); *G02F 2001/13415* (2013.01); *G02F 2202/28* (2013.01); *G02F 2001/133354* (2013.01)
USPC ........... 156/285; 156/286; 156/382; 156/104; 425/504; 425/388; 425/405.1; 425/405.2; 264/511; 264/526; 264/553; 264/566; 264/568; 264/571

(58) Field of Classification Search
USPC ........... 264/1.1–2.7, 511, 526, 553, 566, 568, 264/571; 156/285, 286, 382, 104; 425/504, 425/388, 405.1, 405.2
See application file for complete search history.

(56) References Cited

U.S. PATENT DOCUMENTS

| 5,870,224 A * | 2/1999 | Saitoh et al. .................. 359/456 |
| 2003/0173033 A1* | 9/2003 | Lee et al. ...................... 156/382 |

(Continued)

FOREIGN PATENT DOCUMENTS

| JP | 6-24853 | 2/1994 |
| JP | 2005-88351 | 4/2005 |
| JP | 2005-536782 | 12/2005 |

OTHER PUBLICATIONS

International Search Report issued Dec. 20, 2011 in International (PCT) Application No. PCT/JP2011/005834.

(Continued)

*Primary Examiner* — Richard Crispino
*Assistant Examiner* — Matthew Hoover
(74) *Attorney, Agent, or Firm* — Wenderoth, Lind & Ponack, LLP (57) ABSTRACT

A method for manufacturing a semi-finished blank for a varifocal liquid crystal lens includes coating the front of a first substrate and/or the rear of a second substrate with an adhesive agent, leaving an adhesive agent-free region that surrounds a liquid crystal holder; after said coating operation, reducing the pressure inside a sealed vessel that holds the first substrate and the second substrate, with respect to atmospheric pressure; affixing the second substrate over the front of the first substrate in the reduced pressure environment produced in said reducing the pressure operation; performing a standby operation including continuing the affixed state between the first substrate and the second substrate for a specific length of time in the reduced pressure environment produced in said reducing the pressure operation after the substrates have been affixed; and after said standby operation, restoring the pressure of the sealed vessel.

20 Claims, 8 Drawing Sheets

(56) References Cited

U.S. PATENT DOCUMENTS

| | | |
|---|---|---|
| 2003/0178134 A1* | 9/2003 | Muramoto et al. .......... 156/285 |
| 2003/0210377 A1 | 11/2003 | Blum et al. |
| 2004/0041976 A1 | 3/2004 | Kida et al. |
| 2006/0091799 A1* | 5/2006 | Nakamura .................. 313/512 |
| 2008/0314499 A1* | 12/2008 | Begon et al. ................ 156/64 |
| 2009/0220708 A1* | 9/2009 | Schmitt ..................... 428/29 |
| 2009/0256977 A1* | 10/2009 | Haddock et al. ............. 349/13 |

OTHER PUBLICATIONS

Written Opinion of the International Searching Authority issued Apr. 19, 2011 in International (PCT) Application No. PCT/JP2011/005834.

Extended European Search Report issued Dec. 6, 2013 in corresponding European Application No. 11848495.5.

* cited by examiner

METHOD FOR MANUFACTURING SEMI-FINISHED BLANK FOR VARIFOCAL LENS

TECHNICAL FIELD

The present invention relates to a method for manufacturing a semi-finished blank for a high-quality varifocal lens.

BACKGROUND ART

In the past, a semi-finished blank for a varifocal lens was constituted so as to include a lower substrate whose front had a convex curved surface, and an upper substrate whose back had a concave curved surface and which was joined opposite this front. A varifocal section including a liquid crystal material was disposed between the upper and lower substrates. The refractive index of this varifocal section could be varied by applying voltage to the varifocal section, so the product could be used as a lens for bifocal eyeglasses, for example.

Patent Literature 1, for instance, discloses a method for manufacturing a semi-finished blank for a varifocal lens, in which, in the joining of an upper substrate and a lower substrate, the upper and lower substrates are stuck together and then an adhesive agent is introduced through one of two holes provided near the outer periphery of the upper substrate in a state in which the upper substrate has been pressed to the varifocal section via a pad, and air or the like is blown through the other hole so that the adhesive agent moves over all of both substrates.

CITATION LIST

Patent Literature

Patent Literature 1: US Laid-Open Patent Application 2009/256977

SUMMARY

However, with a conventional manufacturing method, there was the risk of decreasing the performance of the varifocal lens.

Specifically, with a conventional manufacturing method, the upper substrate was tightly pressed to the varifocal section side and the adhesive agent introduced so that the adhesive agent would not work its way into the varifocal section. Here, the local stress imparted to the varifocal section created problems such as damage to the lens and the generation of spaces within the varifocal section after pressure restoration, and there was the risk of decreasing the performance of the varifocal lens.

It is an object of the present invention to provide a method for manufacturing a semi-finished blank for a varifocal lens with which a decrease in the performance of the varifocal lens can be prevented.

To achieve the stated object, the method of the present invention for manufacturing a semi-finished blank for a varifocal lens is constituted such that a liquid crystal holder is disposed between the front of a first substrate and the rear of a second substrate that is opposite the first substrate, comprising an adhesive agent coating step, a pressure reduction step, an affixing step, a standby step, and a pressure restoration step. The adhesive agent coating step involves coating the front of a first substrate and/or the rear of a second substrate with an adhesive agent, leaving an adhesive agent-free region that surrounds the liquid crystal holder. The pressure reduction step involves reducing the pressure inside a sealed vessel that holds the first substrate and the second substrate, with respect to atmospheric pressure. The affixing step involves affixing the second substrate over the front of the first substrate in the reduced pressure environment produced in the pressure reduction step. The standby step involves continuing the affixed state between the first substrate and the second substrate for a specific length of time in the reduced pressure environment produced in the pressure reduction step after the substrates have been affixed. The pressure restoration step involves restoring the pressure of the sealed vessel after the standby step.

Also, it is preferable if the method of the present invention for manufacturing a semi-finished blank for a varifocal lens further comprises a liquid crystal coating step of coating the liquid crystal holder with a liquid crystal material by inkjet.

Also, it is preferable if the method of the present invention for manufacturing a semi-finished blank for a varifocal lens is such that the plurality of liquid crystal grains applied by inkjet in the liquid crystal coating step are applied spaced apart so as not to overlap each other.

Also, it is preferable if the method of the present invention for manufacturing a semi-finished blank for a varifocal lens is such that, in the liquid crystal coating step, the liquid crystal holder formed in a partial region on the front of the first substrate is coated with the liquid crystal material, and the coating amount is the amount in which the liquid crystal material is held on the liquid crystal holder by surface tension after the sealed vessel has been restored to atmospheric pressure.

Also, it is preferable if the method of the present invention for manufacturing a semi-finished blank for a varifocal lens is such that, in the adhesive agent coating step, the front of the first substrate and/or the rear of the second substrate is coated with the adhesive agent, with the plurality of adhesive agent grains spaced apart so as not to overlap each other and so as to surround the adhesive agent-free region.

Advantageous Effects

A decrease in the performance of a varifocal lens can be prevented with the present invention.

Specifically, when the second substrate is affixed over the front of the first substrate, a ring-shaped adhesive agent region is formed around the liquid crystal holder, with an adhesive agent-free region in between them. After this, pressure is restored to the sealed vessel, so that the adhesive agent is drawn in to the boundary at the outer periphery of the liquid crystal holder. That is, since the first substrate and second substrate are joined by packing the adhesive agent up to the boundary at the outer periphery of the liquid crystal holder without applying any pressing force on the liquid crystal holder, a decrease in the performance of the varifocal lens can be prevented without creating any problems such as damaging the liquid crystal holder or generating a space inside the liquid crystal holder.

DESCRIPTION OF EMBODIMENTS

Figure 1:
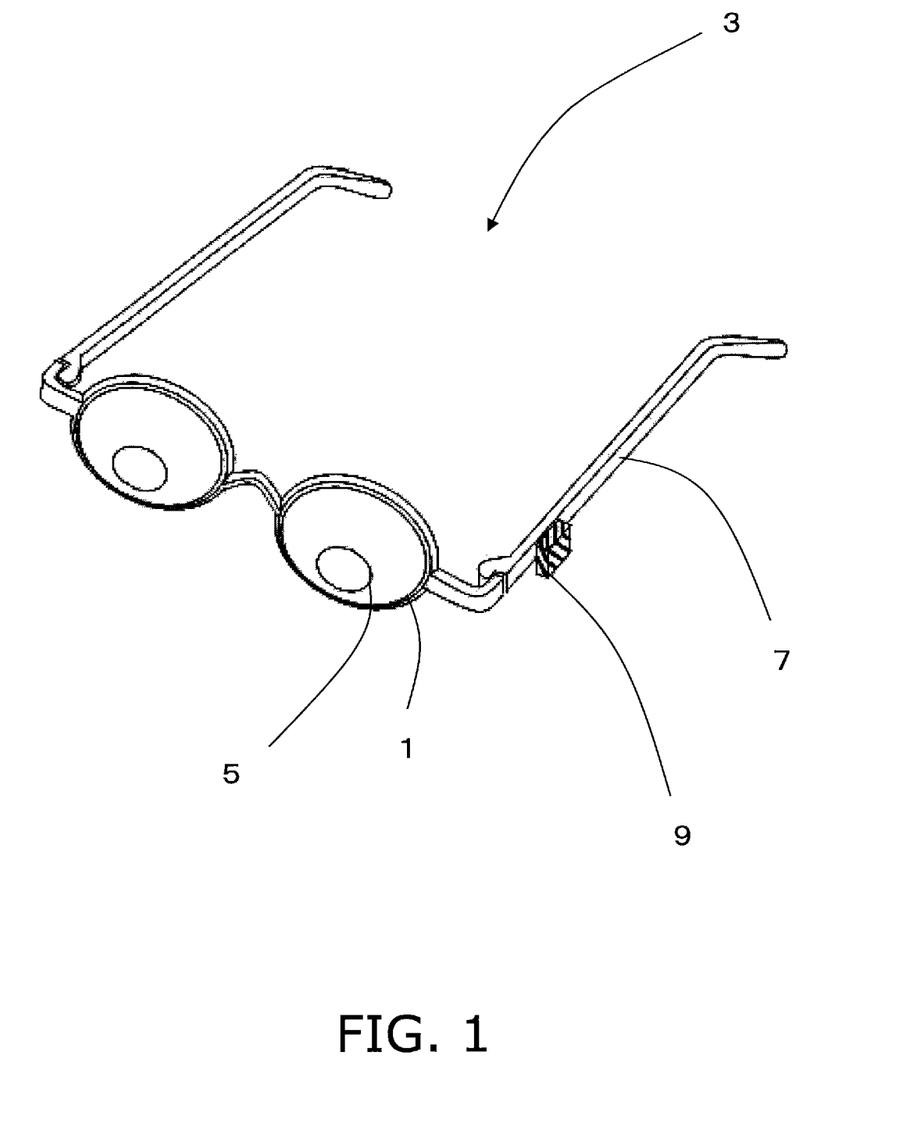
FIG. 1 is an oblique view of varifocal eyeglasses pertaining to an embodiment of the present invention.

The semi-finished blank for a varifocal lens of the present invention will now be described in detail along with the drawings. FIG. 1 is a simplified diagram of varifocal eyeglasses 3 obtained by subjecting the semi-finished blank for a varifocal lens of this embodiment to surfacing, edging, or another such specific process.

A varifocal section 5 that includes a cholesteric liquid crystal material 39 is formed in the lower region slightly below the center of a varifocal lens 1. Also, a circuit section 9 having a battery, a sensor circuit, etc., (not shown), is provided to an eyeglass frame 7. For example, a sensor circuit featuring an acceleration sensor has the function of outputting an on/off signal according to the up and down angle of the head of the person wearing the varifocal eyeglasses 3, and controls the voltage that is applied to the varifocal section 5.

With the varifocal eyeglasses 3 constituted as above, the application of voltage to the varifocal section 5 is switched on the basis of a signal from the sensor circuit. This allows the varifocal eyeglasses 3 to function as bifocal eyeglasses by changing the apparent refractive index of the varifocal section 5.

Figure 2:
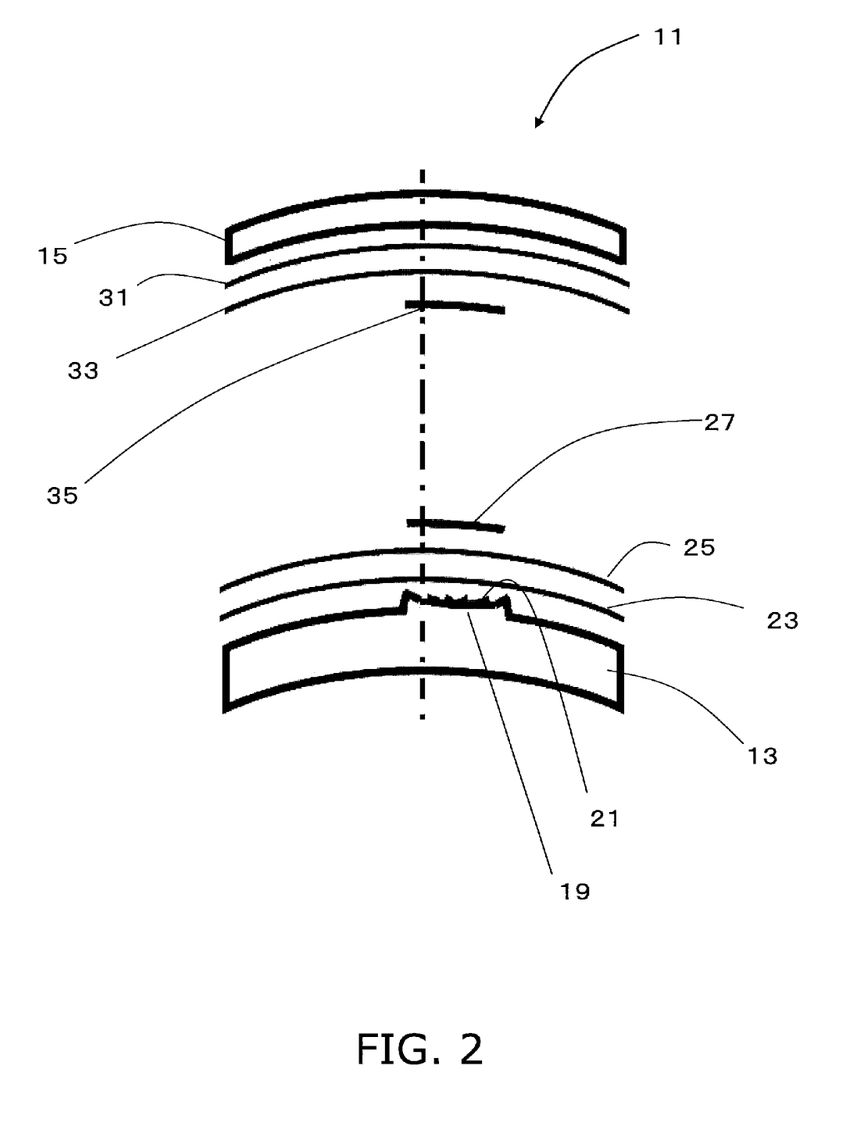
FIG. 2 is a simplified exploded view of the first and second substrates constituting the semi-finished blank for a varifocal lens pertaining to an embodiment of the present invention.

Next, the configuration of a varifocal lens semi-finished blank 11 will be described. FIG. 2 is a simplified exploded view of a first substrate 13 and a second substrate 15 that is joined opposite the first substrate 13.

As shown in FIG. 2, the first substrate 13 has a front with a convex curved surface, and a rear with a concave curved surface. A liquid crystal holder 19 is formed on the convex curved surface of the first substrate 13. A Fresnel lens section 21 is formed on the surface of the liquid crystal holder 19. A first transparent conductive film 23 and a first silicon dioxide film 25 are formed in that order, starting from the first substrate 13 side, on the convex curved surface of the first substrate 13, and a first orientation film 27 is formed on the surface convex curved surface) of the first silicon dioxide film 25 in the region corresponding to the Fresnel lens section 21.

The second substrate 15 has a front with a convex curved surface and a rear with a concave curved surface. A second transparent conductive film 31 and a second silicon oxide film 33 are formed in that order, starting from the second substrate 15 side, on the concave curved surface. A second orientation film 35 is formed in the region of the second silicon oxide film 33 that is opposite the Fresnel lens section 21.

The first and second substrates 13 and 15 are made of thiourethane or another such plastic.

Figure 3:
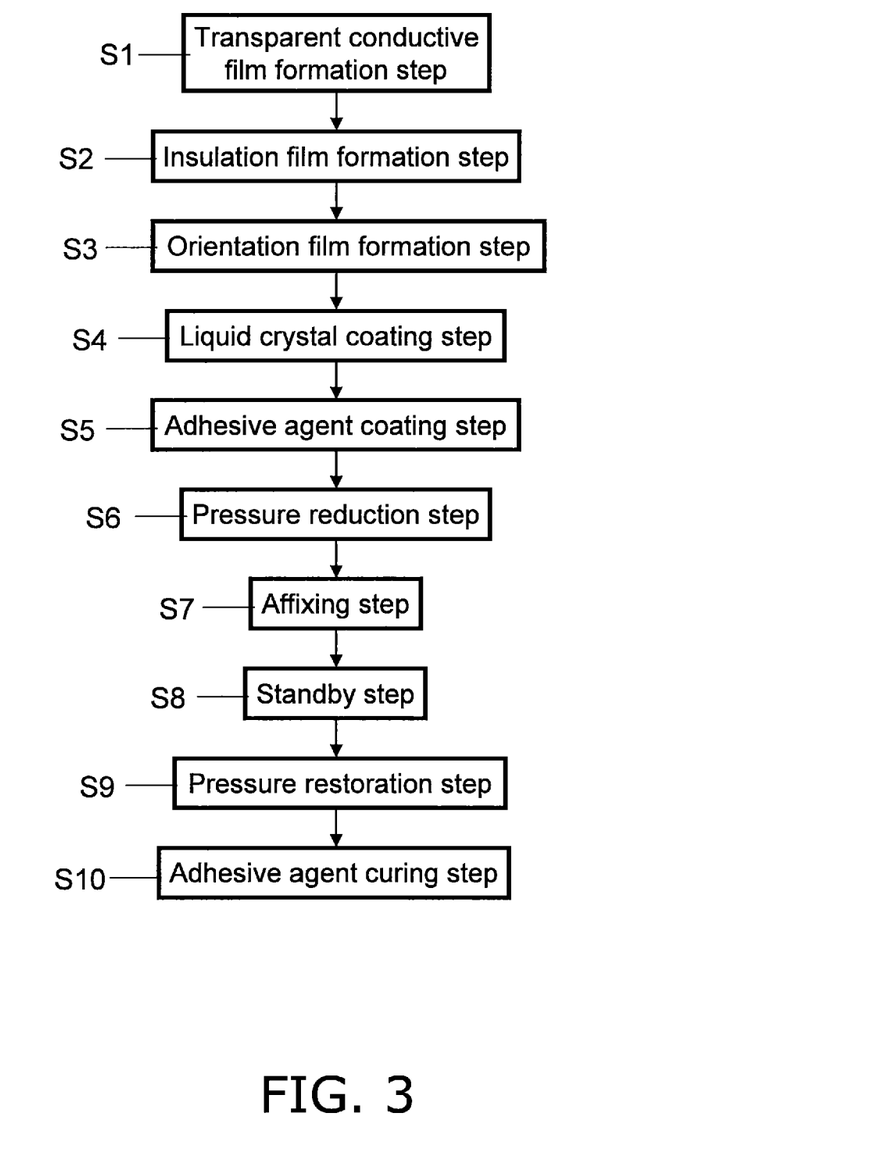
FIG. 3 is a flowchart of some of the steps involved in the method for manufacturing the semi-finished blank for a varifocal lens in FIG. 2.

The varifocal lens semi-finished blank 11 with this constitution is manufactured as shown in the flowchart in FIG. 3.

In step 1, which is a step of forming transparent conductive films, the first transparent conductive film 23 and the second transparent conductive film 31 are formed by sputtering over substantially the entire convex curved surface of the first substrate 13 and the concave curved surface of the second substrate 15, respectively. The first and second transparent conductive films 23 and 31 are preferably formed in a thickness of 10 to 30 nm. Although this will not be described in detail, internal electrodes of the first and second transparent conductive films 23 and 31 are formed by spin coating and using a masking sheet, either directly before or directly after step 1. The role of these internal electrodes is to improve contact between the transparent conductive films and external electrodes connected to the circuit section 9.

In step 2, which is an insulation layer formation step, the first and second silicon oxide films 25 and 33 are formed by sputtering. The first silicon dioxide film 25 and the second silicon oxide film 33 are formed by lamination over the first transparent conductive film 23 and the second transparent conductive film 31, respectively.

In step 3, which is an orientation film formation step, a first orientation film 27 is formed over the liquid crystal holder 19 of the first substrate 13. A second orientation film 35 is then formed over the concave curved surface of the second substrate 15 so as to sandwich, along with the first orientation film 27, the cholesteric liquid crystal material 39 applied over the liquid crystal holder 19 in step 4. Specifically, the first orientation film 27 and the second orientation film 35 are laminated over the first silicon dioxide film 25 and the second silicon oxide film 33, respectively, and are formed so as to be opposite one another.

In step 4, which is a liquid crystal coating step, the cholesteric liquid crystal material 39 is applied toward the liquid crystal holder 19 with an inkjet 37. More precisely, the first orientation film 27 formed on the Fresnel lens section 21 is coated with the cholesteric liquid crystal material 39. The temperature and nozzle diameter can be suitably selected in applying the cholesteric liquid crystal material 39 with the inkjet 37. In this embodiment, liquid crystal grains (300 pL per grain, 3% difference) of the cholesteric liquid crystal material 39 were applied using a nozzle with a diameter of 100 μm and at a nozzle tip temperature of 70 degrees.

The coating amount with the cholesteric liquid crystal material 39 is the amount in which the liquid crystal material 39 is held on the liquid crystal holder 19 by surface tension after the pressure restoration step (step 9) has ended. Also, the grains of the cholesteric liquid crystal material 39 are applied spaced apart so as not to overlap each other. The purpose of this is to prevent air bubbles from becoming admixed into the cholesteric liquid crystal material 39.

Here, the cholesteric liquid crystal material 39 is preferably applied to the Fresnel lens section 21 on the surface of the liquid crystal holder 19 so that there is a slight excess. This suppresses manufacturing defects in the varifocal lens semi-finished blank 11 that would be caused by variance in the liquid crystal material coating state, and manufacturing variance in the first and second substrates 13 and 15 or the liquid crystal holder 19. Specifically, even if such variance should cause a tiny deviation in the coating region of the cholesteric liquid crystal material 39, the cholesteric liquid crystal material 39 that has been applied in excess can eventually spread out to cover the required area.

Figure 4:
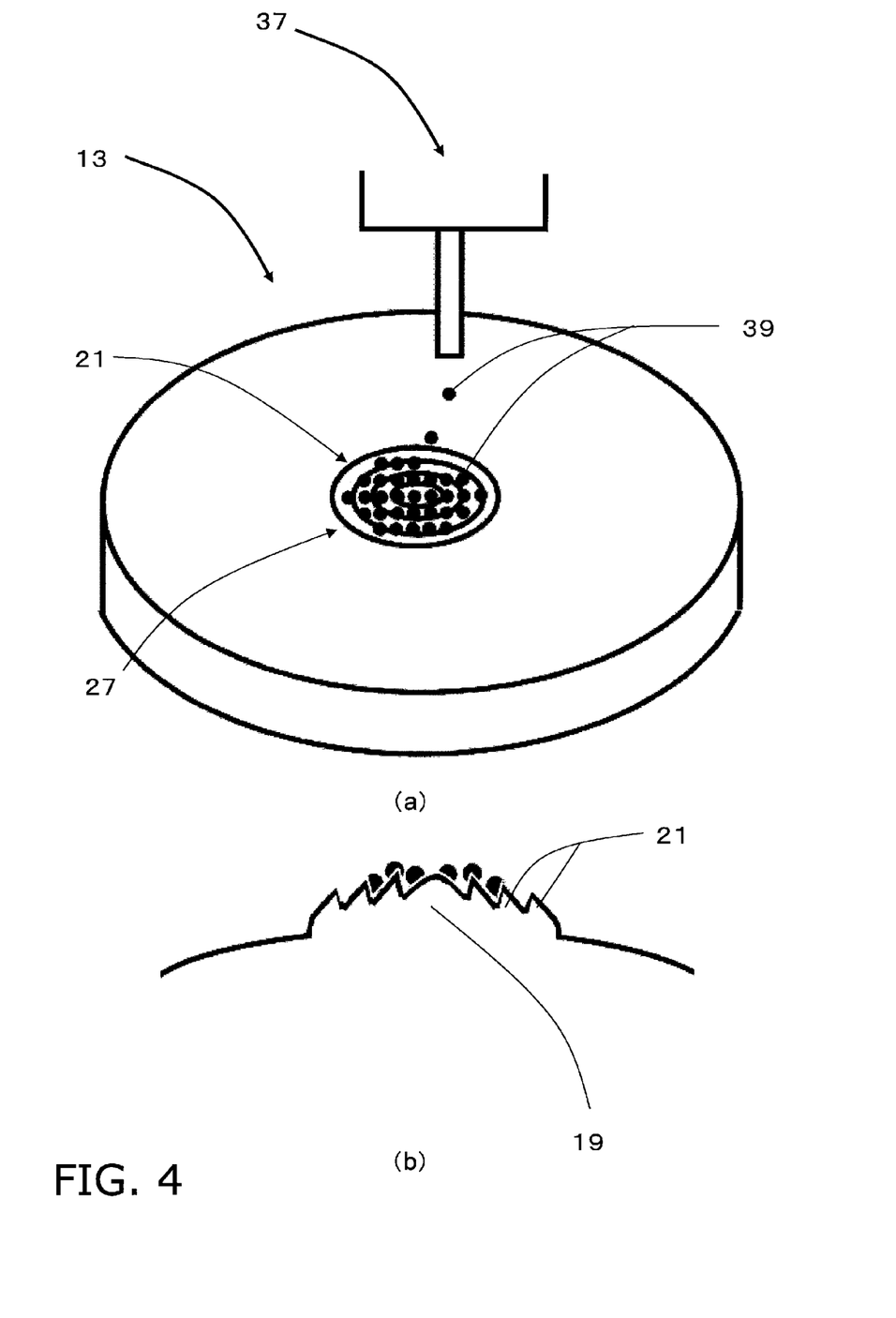
FIG. 4a is an oblique view of the state when the first substrate of the semi-finished blank for a varifocal lens in FIG. 2 is coated with a liquid crystal material.
FIG. 4b is a detail cross section thereof.

FIG. 4a shows the state when the inkjet 37 is used to apply the cholesteric liquid crystal material 39 toward the Fresnel lens section 21 of the first substrate 13. More specifically, it shows the state when the cholesteric liquid crystal material 39 is applied over the first orientation film 27 formed on the Fresnel lens section 21. The cholesteric liquid crystal material 39 is preferably not applied near the outermost peripheral portion of the Fresnel lens section 21, as shown in FIG. 4b, taking into account the face that the material will eventually spread out over substantially the entire Fresnel lens section 21 after the second substrate 15 has been affixed to the surface of the first substrate 13.

Figure 5:
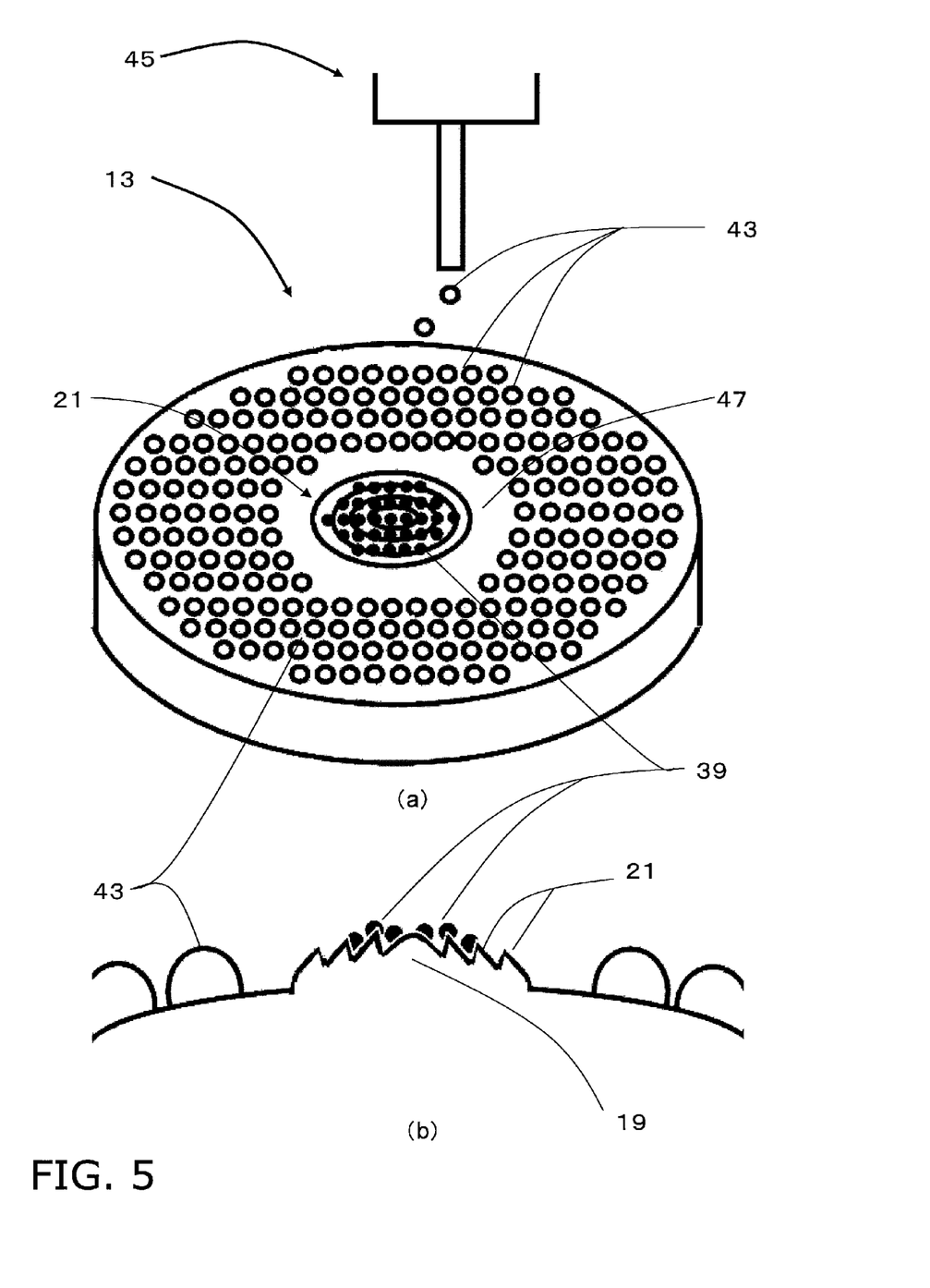
FIG. 5a is an oblique view of the state when the first substrate of the semi-finished blank for a varifocal lens in FIG. 2 is coated with an adhesive agent.
FIG. 5b is a detail cross section thereof.
Figure 7:
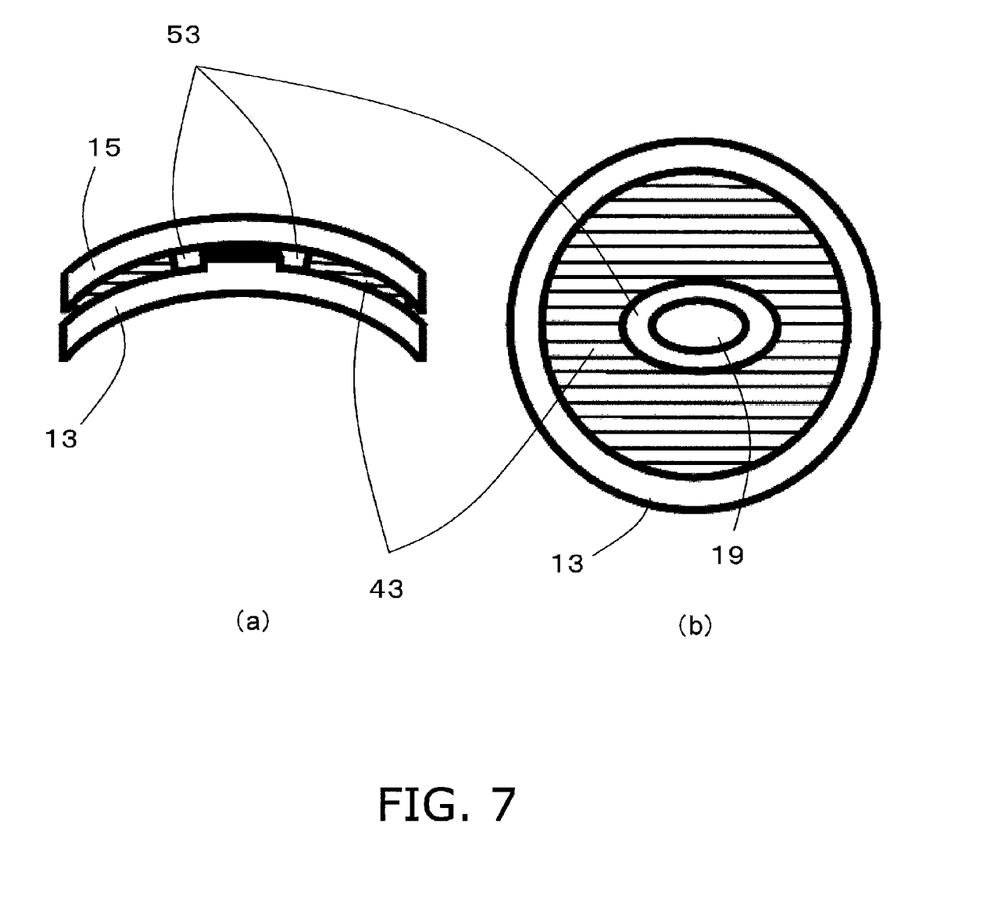
FIG. 7a is a cross section showing the state in the standby step, which is one of the steps in the method for manufacturing the semi-finished blank for a varifocal lens in FIG. 2.
FIG. 7b is a plan view thereof.

Step 5 is an adhesive agent coating step in which a jet dispenser 45 is used. As shown in FIG. 5, an adhesive agent 43 is applied to the convex curved surface of the first substrate 13, leaving a specific spacing so that there is no overlap. As shown in FIG. 7, the adhesive agent 43 is applied so as to create a sealed space 53 around the liquid crystal holder 19 when adjacent drops of the adhesive agent 43 link up in the affixing step (step 7). The amount in which the adhesive agent 43 is applied here is set so that the adhesive agent 43 will spread out over substantially the entire convex curved surface of the first substrate 13, except for the liquid crystal holder 19, by the time the pressure restoration step (step 9) ends.

The adhesive agent 43 is applied so as to form a region that approximates a doughnut shape when seen from the front of the first substrate 13. Specifically, an adhesive agent-free region 47 where no adhesive agent 43 is applied is provided to a specific region from near the liquid crystal holder 19 (the Fresnel lens section 21) and its periphery toward the outer periphery of the first substrate 13. The adhesive agent-free region 47 is formed by taking into account the coating pattern and coating amount of the adhesive agent 43, the final thickness of the adhesive agent layer, the size and shape of the liquid crystal holder 19, the degree of pressure reduction (step 6), and so forth. Also, the area near the outer periphery of the first substrate 13 is not coated with the adhesive agent 43 in order to prevent the adhesive agent 43 from oozing out from the outer periphery of the first substrate 13.

The adhesive agent 43 used in this embodiment has grains of about the same amount, but may instead be used as a linear adhesive agent.

The vacuum sealing step will now be described in detail. This vacuum sealing step consists of the pressure reduction step (step 6), the affixing step (step 7), the standby step (step 8), and the pressure restoration step (step 9).

Figure 6:
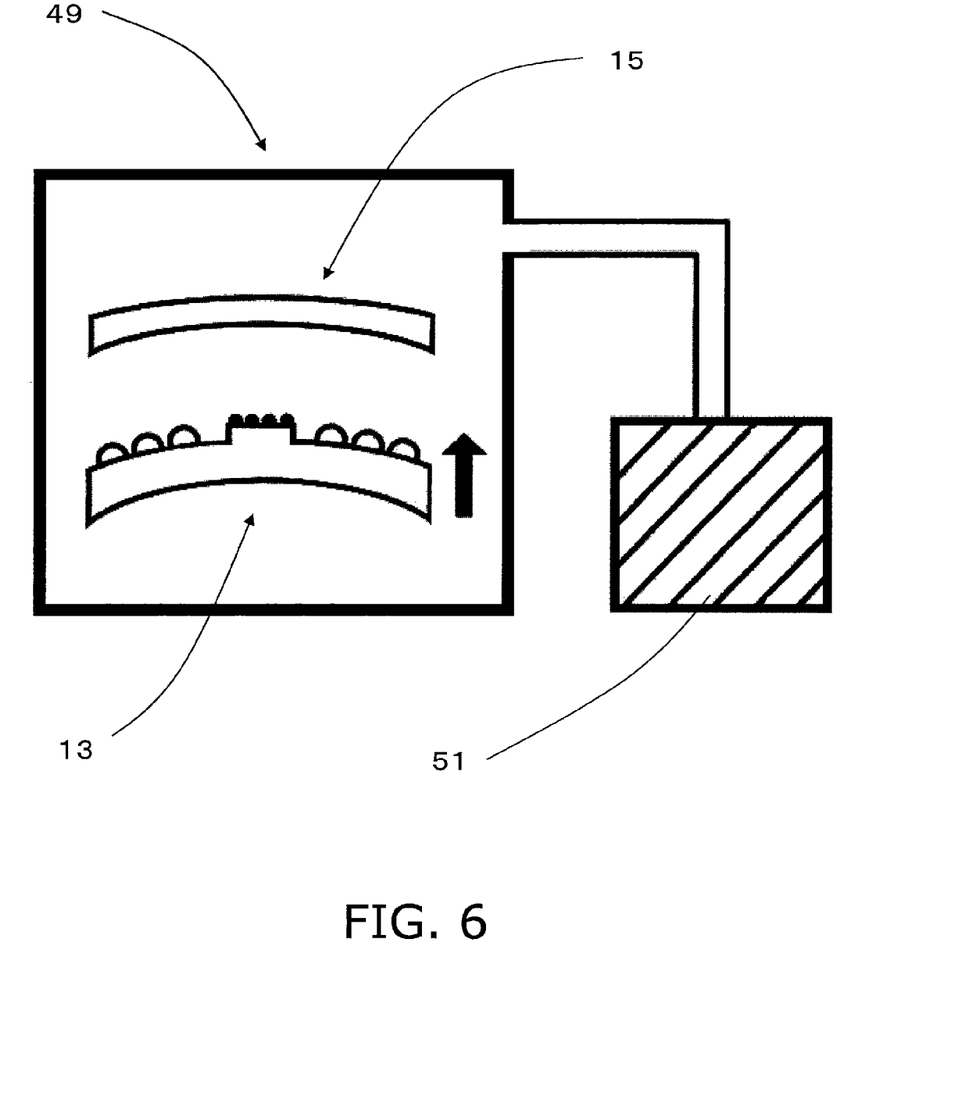
FIG. 6 is a simplified cross section showing the step of joining the first and second substrates of the semi-finished blank for a varifocal lens in FIG. 2 inside a sealed vessel with reduced pressure.

As shown in FIG. 6, in step 6 a reduced pressure state (with respect to atmospheric pressure) is created with a vacuum pump 51 inside a sealed vessel 49, which houses the first substrate 13 and the second substrate 15 coated with the cholesteric liquid crystal material 39 and the adhesive agent 43.

Step 7 is a step of affixing the first substrate 13 and the second substrate 15 together. The first and second substrates 13 and 15 are fixed by a fixing member (not shown) so as to face each other with a gap in between, inside the sealed vessel 49. The first substrate 13 is moved upward toward the second substrate 15, and the fixing of the second substrate 15 is released at the point when it comes into contact with the first substrate 13. Consequently, the surface of the first substrate 13 is pressed on by the weight of the second substrate 15.

In step 8, which is a standby step, the state in which the first substrate 13 and the second substrate 15 were affixed in step 7 is maintained for a specific length of time. As shown in FIG. 7, the adhesive agent 43 spreads out when the grains of the adhesive agent 43 are pressed under the weight of the second substrate 15 in the standby step, and the grains of the adhesive agent 43 link up as a result. This forms a sealed space 53, which is independent from the exterior of the varifocal lens semi-finished blank 11, in the adhesive agent-free region 47 by cutting the sealed space 53 off from the space to the outside of the adhesive agent 43. Specifically, the adhesive agent-free region 47 is converted into the sealed space 53, which is bound by the first substrate 13, the second substrate 15, and the adhesive agent 43, and forms a ring-shaped adhesive agent region around the outer periphery of the sealed space 53.

In this embodiment, this sealed space 53 is easily formed since the distance between the outer periphery of the adhesive agent-free region 47 and the outer periphery of the liquid crystal holder 19 is greater than the spacing at which the grains of the adhesive agent 43 are applied near the outer periphery of the adhesive agent-free region 47.

In step 9, the inside of the sealed vessel 49, which was put under a reduced pressure environment in step 6, is restored to atmospheric pressure. The adhesive agent-free region 47 around the liquid crystal holder 19 is bounded by the adhesive agent 43, so the adhesive agent 43 is drawn in toward the sealed space 53 of the adhesive agent-free region 47. Also, since the adhesive agent 43 is tacky, the speed at which it flows does not keep up with the pressure restoration speed. Accordingly, the inside of the sealed space 53 takes on a negative pressure. The second substrate 15 is pressed against the first substrate 13 by atmospheric pressure due to the negative pressure inside the sealed space 53. As a result, the cholesteric liquid crystal material 39 goes all the way across the entire Fresnel lens section 21 of the liquid crystal holder 19, and goes across the entire convex curved surface of the first substrate 13 except for the liquid crystal holder 19, and the sealed space 53 is substantially eliminated as shown in FIGS. 8a and 8b.

The coating amount of the cholesteric liquid crystal material 39 here is the amount in which the liquid crystal material 39 is held on the liquid crystal holder 19 by surface tension on the second substrate 15 after the sealed vessel has been restored to atmospheric pressure. Accordingly, what is drawn to the adhesive agent-free region 47 is just the adhesive agent 43, and not the cholesteric liquid crystal material 39. Specifically, there is no mixing of the adhesive agent 43 and the cholesteric liquid crystal material 39, so the bonding strength at the bonding layer can be raised.

Figure 8:
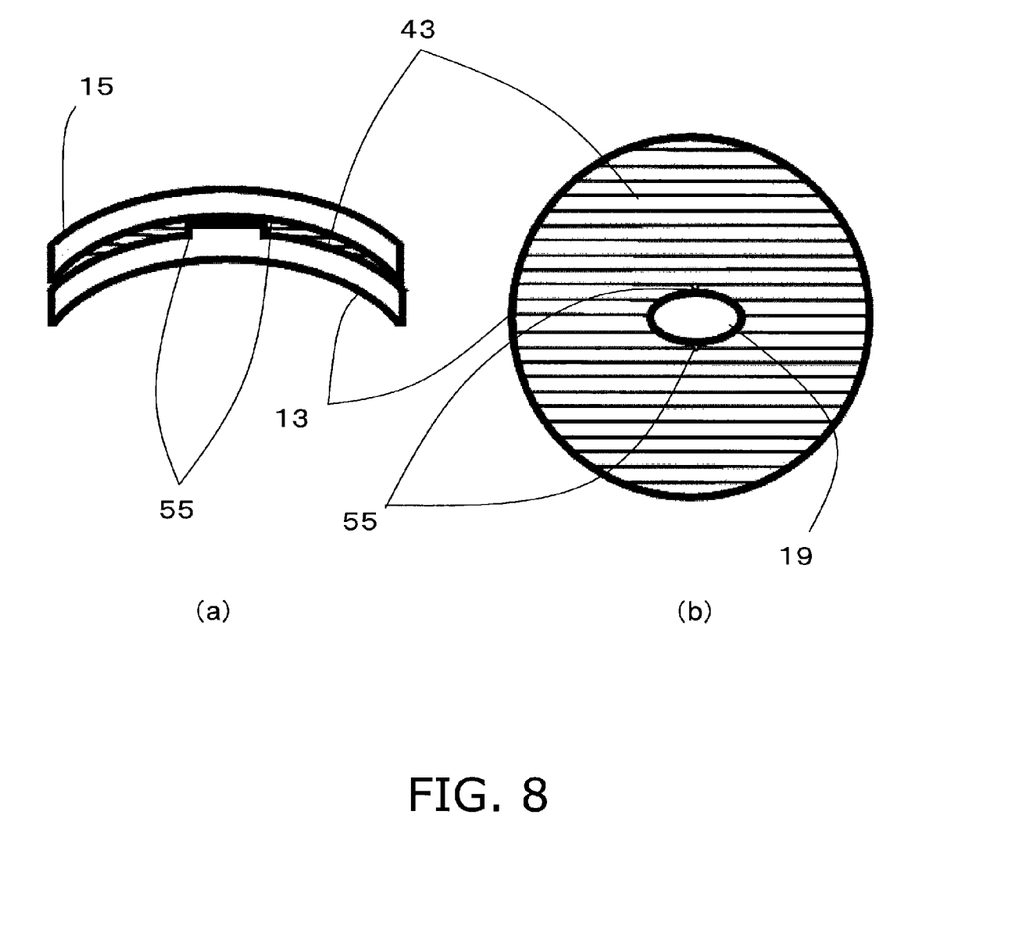
FIG. 8a is a cross section showing the state in the pressure reduction step, which is one of the steps in the method for manufacturing the semi-finished blank for a varifocal lens in FIG. 2.
FIG. 8b is a plan view thereof.

The adhesive agent 43 is drawn into the sealed space 53 of the adhesive agent-free region 47 mainly in the pressure restoration step, but this space does not go under a perfect vacuum even in the pressure restoration step (step 6). Accordingly, this space is not necessarily completely filled by the adhesive agent 43. Therefore, as shown in FIG. 8, extremely small air bubbles 55 are left behind near the outer peripheral part of the liquid crystal holder 19. In FIG. 8, the air bubbles 55 are exaggerated and shown as larger points, but in reality these air bubbles 55 are extremely small. Furthermore, the air bubbles 55 lie along a boundary line between the varifocal section 5 and the rest of the region, so they are hard to see and pose no problem whatsoever to practical use.

It is predicted that the air bubbles 55 tend to occur at two points near the intersection between the outer periphery of the varifocal section 5 and the minor axis of the ellipse when the varifocal section 5 is substantially in the form of an ellipse, and tend to occur at one point on the outer periphery of the varifocal section 5 when the varifocal section 5 is substantially in the form of a circle.

Finally, in step 10, which is an adhesive agent curing step, the region occupied by the adhesive agent 43 is irradiated with ultraviolet rays, visible light, or the like to cure the adhesive agent 43. This step may, if needed, include a step of thoroughly spreading out the adhesive agent 43 between the upper and lower first substrate 13 and second substrate 15 for a specific length of time prior to the curing of the adhesive agent 43.

In this embodiment, an example was given in which the cholesteric liquid crystal material 39 was applied over the liquid crystal holder 19, but the present invention is not limited to this. For example, instead of this, or in addition to it, the region of the second substrate 15 that is opposite the liquid crystal holder 19, namely, the second orientation film 35, may be coated with the cholesteric liquid crystal material 39.

Also, the liquid crystal holder 19 was formed on the front of the first substrate 13, but may be formed on the rear of the second substrate 15.

Also, in this embodiment an example was given in which the convex curved surface of the first substrate 13 was coated with the adhesive agent 43, but the present invention is not limited to this. For example, the concave curved surface of the second substrate 15 may be coated with the adhesive agent 43, or both surfaces may be coated.

Furthermore, in this embodiment an example was given in which the liquid crystal holder 19 was provided on a base that protrude into a partial region on the front of the first substrate 13, but the present invention is not limited to this. For example, the configuration may be such that the base itself is not present on the front of the first substrate 13, and the Fresnel lens section 21 is provided instead. In this case, the liquid crystal holder 19 is constituted by the Fresnel lens section 21. Also, the configuration may be such that a concave portion is provided on the front of the first substrate 13 as the liquid crystal holder 19.

As discussed above, in this embodiment the adhesive agent 43 is applied so as to form the sealed space 53 in the adhesive agent-free region 47 in the standby step under a reduced pressure environment. In the pressure restoration step, the adhesive agent 43, which surrounds the sealed space 53 in a ring shape, is drawn to the sealed space 53 side.

Therefore, there is no need to press on the liquid crystal holder in order to join the first substrate and second substrate as with prior art, so there will be no problems such as damage to the lens or the generation of spaces within the liquid crystal holder. Thus, a varifocal lens semi-finished blank 11 can be manufactured without any decrease in performance.

Also, in this embodiment the cholesteric liquid crystal material 39 was applied only in the amount held on the liquid crystal holder 19 by surface tension at the stage of the pressure restoration step using the inkjet 37. Consequently, the cholesteric liquid crystal material 39 is not drawn all the way into the sealed space 53, and the adhesive agent 43 can be sent to the places where it is needed.

Furthermore, since there is no need to provide a hole in the upper substrate as with prior art, the entire blank can be effectively utilized in edging of the lens.

Industrial Applicability

The method for manufacturing a semi-finished blank for a varifocal lens pertaining to the present invention can be widely applied as a manufacturing method for optical parts such as eyeglass lenses and cameras.

Reference Signs List
- 1 varifocal lens
- 3 varifocal eyeglasses
- 5 varifocal section
- 7 eyeglass frame
- 9 circuit section
- 11 semi-finished blank for a varifocal lens
- 13 first substrate
- 15 second substrate
- 19 liquid crystal holder
- 21 Fresnel lens section
- 23 first transparent conductive film
- 25 first silicon dioxide film
- 27 first orientation film
- 31 second transparent conductive film
- 33 second silicon oxide film
- 35 second orientation film
- 37 inkjet
- 39 cholesteric liquid crystal material
- 43 adhesive agent
- 45 jet dispenser
- 47 adhesive agent-free region
- 49 sealed vessel
- 51 vacuum pump
- 53 sealed space
- 55 air bubble

The invention claimed is:

1. A method for manufacturing a semi-finished blank for a varifocal liquid crystal lens, the method comprising:
    coating the front of a first substrate and/or the rear of a second substrate with an adhesive agent in an adhesive agent region, leaving an adhesive agent-free region that surrounds a liquid crystal holder;
    after said coating operation, reducing the pressure inside a sealed vessel that holds the first substrate and the second substrate with respect to atmospheric pressure;
    affixing the second substrate over the front of the first substrate in the reduced pressure environment produced in said reducing the pressure operation, wherein the liquid crystal holder is disposed between the front of the first substrate and the rear on the second substrate, and the second substrate opposes the first substrate;
    performing a standby operation including continuing the affixed state between the first substrate and the second substrate for a specific length of time in the reduced pressure environment produced in said reducing the pressure operation after the substrates have been affixed; and
    after said standby operation, causing the adhesive agent to spread throughout the adhesive agent-free region by restoring the pressure of the sealed vessel.

2. The method of claim 1, further comprising coating the liquid crystal holder with a liquid crystal material.

3. The method of claim 2, wherein said coating the liquid crystal holder operation includes using an inkjet to apply a plurality of liquid crystal grains spaced apart so as not to overlap each other.

4. The method of claim 2, wherein the liquid crystal holder is formed in a partial region on the front of the first substrate,
    wherein, in said coating the liquid crystal holder operation, the coating amount is the amount in which the liquid crystal material is held on the liquid crystal holder by surface tension after the sealed vessel has been restored to atmospheric pressure.

5. The method of claim 1, wherein said reducing the pressure operation is performed with a vacuum pump inside the sealed vessel.

6. The method of claim 1, wherein said adhesive agent coating operation includes forming a plurality of adhesive agent grains spaced apart so as not to overlap each other and so as to surround the adhesive agent-free region.

7. The method of claim 6, wherein the distance between the outer periphery of the adhesive agent-free region and the outer periphery of the liquid crystal holder is greater than the spacing at which the grains of the adhesive agent are applied near the outer periphery of the adhesive agent-free region.

8. The method of claim 1, wherein a sealed space is formed in the adhesive agent-free region by the adhesive agent in the standby operation.

9. The method of claim 8, wherein the adhesive agent is applied, leaving a specific spacing so that there is no overlap, in the adhesive agent coating operation.

10. The method of claim 1, wherein the first and second substrates are affixed to each other by the weight of the first or second substrate, in the affixing operation.

11. The method of claim 1, wherein said coating the liquid crystal holder operation includes using an inkjet to apply a plurality of liquid crystal grains spaced apart so as not to overlap each other,
wherein said standby operation is performed such that the liquid crystal grains spread out and link up and form a sealed space around the liquid crystal holder.

12. A method for manufacturing a semi-finished blank for a varifocal liquid crystal lens, the method comprising:
coating the front of a first substrate and/or the rear of a second substrate with an adhesive agent in an adhesive agent region, leaving a space from a liquid crystal holder;
reducing the pressure inside a sealed vessel that holds the first substrate and the second substrate with respect to atmospheric pressure;
affixing the second substrate over the front of the first substrate in the reduced pressure environment produced in said reducing the pressure operation, wherein the liquid crystal holder is disposed between the front of the first substrate and the rear on the second substrate, and the second substrate opposes the first substrate;
performing a standby operation including continuing the affixed state between the first substrate and the second substrate for a specific length of time in the reduced pressure environment produced in said reducing the pressure operation after the substrates have been affixed; and
after said standby operation, causing the adhesive agent to spread throughout the space by restoring the pressure of the sealed vessel.

13. The method of claim 12, further comprising forming a fresnel lens section on the surface of the liquid crystal holder.

14. The method of claim 12, wherein said coating operation is performed such that the space is disposed at an outer periphery of the liquid crystal holder and the adhesive agent region is disposed at an outer periphery of the space.

15. The method of claim 14, wherein after said restoring the pressure of the sealed vessel, the adhesive agent has spread into the space but has not spread over the liquid crystal holder.

16. The method of claim 14, wherein during said restoring the pressure of the sealed vessel, the adhesive agent is drawn to the outer periphery of the liquid crystal holder.

17. The method of claim 1, further comprising forming a fresnel lens section on the surface of the liquid crystal holder.

18. The method of claim 1, wherein said coating operation is performed such that the adhesive agent-free region is disposed at an outer periphery of the liquid crystal holder and the adhesive agent region is disposed at an outer periphery of the adhesive agent-free region.

19. The method of claim 18, wherein after said restoring the pressure of the sealed vessel, the adhesive agent has spread into the adhesive agent-free region but has not spread over the liquid crystal holder.

20. A method for manufacturing a semi-finished blank for a varifocal liquid crystal lens, the method comprising:
coating the front of a first substrate and/or the rear of a second substrate with an adhesive agent in an adhesive agent region, leaving a space that surrounds a liquid crystal holder;
after said coating operation, reducing the pressure inside a sealed vessel that holds the first substrate and the second substrate with respect to atmospheric pressure;
affixing the second substrate over the front of the first substrate in the reduced pressure environment produced in said reducing the pressure operation, wherein the liquid crystal holder is disposed between the front of the first substrate and the rear on the second substrate, and the second substrate opposes the first substrate;
performing a standby operation including continuing the affixed state between the first substrate and the second substrate for a specific length of time in the reduced pressure environment produced in said reducing the pressure operation after the substrates have been affixed; and
after said standby operation, causing the adhesive agent to spread throughout the space by restoring the pressure of the sealed vessel,
wherein said coating operation is performed such that the space is disposed at an outer periphery of the liquid crystal holder and the adhesive agent region is disposed at an outer periphery of the space, and
wherein during said restoring the pressure of the sealed vessel, the adhesive agent is drawn to the outer periphery of the liquid crystal holder.

* * * * *